United States Patent
Hinrichs et al.

(10) Patent No.: US 10,963,570 B2
(45) Date of Patent: Mar. 30, 2021

(54) SECURE BOOT OF REMOTE SERVERS

(71) Applicant: VERIZON MEDIA INC., New York, NY (US)

(72) Inventors: Susan Hinrichs, Urbana, IL (US); Vinith Bindiganavale, Santa Fe Springs, CA (US); Igor Gashinsky, New York, NY (US); Grigor Palandzhyan, Burbank, CA (US)

(73) Assignee: VERIZON MEDIA INC., New York, NY (US)

( * ) Notice: Subject to any disclaimer, the term of this patent is extended or adjusted under 35 U.S.C. 154(b) by 183 days.

(21) Appl. No.: 16/216,302

(22) Filed: Dec. 11, 2018

(65) Prior Publication Data
US 2020/0184078 A1   Jun. 11, 2020

(51) Int. Cl.
| | |
|---|---|
| G06F 21/57 | (2013.01) |
| G06F 9/4401 | (2018.01) |
| H04L 9/08 | (2006.01) |
| H04L 9/30 | (2006.01) |
| H04L 9/32 | (2006.01) |
| G06F 9/00 | (2006.01) |
| G06F 9/44 | (2018.01) |
| G06F 15/177 | (2006.01) |

(52) U.S. Cl.
CPC .......... *G06F 21/575* (2013.01); *G06F 9/4416* (2013.01); *H04L 9/0877* (2013.01); *H04L 9/3073* (2013.01); *H04L 9/3268* (2013.01); *G06F 2221/034* (2013.01)

(58) Field of Classification Search
CPC ... G06F 21/575; G06F 9/4416; H04L 9/3268; H04L 9/0877

USPC .... 713/1, 2, 100, 156, 164; 726/3, 4, 18, 26
See application file for complete search history.

(56) References Cited

U.S. PATENT DOCUMENTS

| | | | | |
|---|---|---|---|---|
| 9,880,859 B2 * | 1/2018 | Swanson | ............... | G06F 9/4416 |
| 2005/0149729 A1 * | 7/2005 | Zimmer | .................. | H04L 63/20 |
| | | | | 713/168 |

(Continued)

OTHER PUBLICATIONS

"Preboot Execution Environment (PXE) Specification Version 2.1"— Intel Corporation, Sep. 20, 1999 http://www.pix.net/software/pxeboot/archive/pxespec.pdf (Year: 1999).*

(Continued)

*Primary Examiner* — Randy A Scott
(74) *Attorney, Agent, or Firm* — James J. DeCarlo; Greenberg Traurig, LLP (57) ABSTRACT

Systems and methods for diskless booting a remote server. The remote server includes a secure cryptoprocessor having a root key that is unique to the cryptoprocessor. Keying information can be fetched from an image server, which includes a certificate associated with the remote server and a private key of a key pair associated with the remote server. The key pair can be generated by the secure cryptoprocessor based on the root key. The client certificate can be created from a public key of the key pair. A mutually authenticated secure channel between the servers can be established by authenticating the servers based at least in part on the loaded keying information. Images of components of the remote server can be fetched from the image server via the secure channel, and then the remote server can be further booted accordingly.

20 Claims, 6 Drawing Sheets

(56) References Cited

U.S. PATENT DOCUMENTS

2012/0265976 A1* 10/2012 Spiers ................ G06F 9/45533
                                                                 713/2
2017/0109176 A1* 4/2017 Shih ..................... G06F 9/4406

OTHER PUBLICATIONS https://trustedcomputinggroup.org/wp-content/uploads/TPM-Main-Part-1-Design-Principles_v1.2_rev116_01032011.pdf.
https://www.trustedcomputinggroup.org/wp-content/uploads/TCG_PCClientImplementation_1-21_1_00.pdf.
https://trustedcomputinggroup.org/wp-content/uploads/TPM-Main-Part-3-Commands_v1.2_rev116_01032011.pdf.
https://tools.ietf.org/html/rfc5246.pdf.
http://ipxe.org.pdf.
https://github.com/Rohde-Schwarz-Cybersecurity/TrustedGRUB2.pdf.

* cited by examiner

SECURE BOOT OF REMOTE SERVERS

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to improved systems and methods for secure booting and re-booting of remote servers. In some specific embodiments disclosed herein, secure booting and re-booting is improved using at least a combination of: (1) a client-server environment that boots a software assembly (retrieved from a network) on client-server environment enabled clients, and (2) a secure cryptoprocessor to assure the integrity of the client-server environment and to provide a root of trust in communication with a trusted data center.

BACKGROUND

Application and content distribution networks, such as a content delivery network (CDN) and an application delivery network (ADN), can provide Internet users with acceptable performance by providing points of presence (POPs) all over the globe. Users can connect with a nearby POP and take advantage of caching and connection reuse at the nearby POP. This distributed model requires that the distribution network sometimes deploys servers in physical locations that are not owned or controlled by the owner of the distribution network. Deploying servers into a semi-trusted environment can introduce several conflicts between security and performance.

A first example problem with deployment of servers in semi-trusted environments is threat actors physically accessing the servers, also the provider of the network may not have complete access to the servers once the servers are deployed. A second example problem with deployment of servers in semi-trusted environments includes a threat actor physically accessing a part of the network or a remote server while it is offline. This can allow the threat actor to secretly access the part of the network or the remote server. A third example problem includes a threat actor intercepting secret data between the remote server and the infrastructure of the distribution network. A fourth example problem includes a threat actor manipulating a physical system, such as the remote server, to yield a compromised running system that is trusted by the infrastructure. A diskless boot can remedy at least the first two mentioned issues to some extent; however, a fifth problem includes the fact that a diskless boot still must rely on the trustworthiness of an external image source when fetching the server's image during boot.

The aforesaid five security problems associated with deployment of servers in semi-trusted environments are just a handful of many issues that can arise out of application and content distribution networks.

SUMMARY

Described herein are improved systems and methods for secure booting and re-booting of remote servers that can overcome at least the five security problems mentioned in the above background section. In general, embodiments disclosed herein can overcome such problems using a combined solution of: (1) a client-server environment that boots a software assembly (retrieved from a network) on client-server environment enabled clients, and (2) a secure cryptoprocessor to assure the integrity of the client-server environment and to provide a root of trust in communication with a trusted data center. Examples of the systems and methods disclosed herein provide specific technical solutions to at least the problems mentioned in the background section and other parts of the application as well as other technical problems not described herein but recognized by those of skill in the art.

The systems and methods disclosed herein can provide a secure remote boot process leveraging (1) a client-server environment that boots a software assembly (retrieved from a network) on client-server environment enabled clients, and (2) a secure cryptoprocessor to assure the integrity of the client-server environment and to provide a root of trust in communication with a trusted data center. For example, the systems and methods disclosed herein can provide a secure remote boot process leveraging an extended preboot execution environment (PXE) such as iPXE. Also, the systems and methods can leverage a trusted platform module (TPM) to provide a root of trust in communication with the trusted data center. Additionally, a mutually authenticated channel can be used to provide a secure remote boot process. Some examples disclosed herein use transport layer security (TLS) mutual authentication to provide a mutually authenticated channel. In different combinations these technologies can address the security concerns of deployments of application and content distribution networks.

To overcome the first problem mentioned the background section regarding distributed networks (i.e., threat actors physically accessing the remote servers or owners not having complete control over the servers), the methods and systems described herein can provide a diskless boot. A diskless boot can protect against the access of the hardware or software of the servers as well overcome the lack of control of a remote server in a semi-trusted site. The diskless boot can protect against unwanted access to keying information, such as keying information that authenticates the remote servers as well as keying information that authenticates the distributing parts of the content and application distribution network.

To overcome the second mentioned problem in the background section (i.e., a secret attack), the methods and systems can use a diskless boot as well. Each time a remote server reboots, it can fetch its boot images from a trusted location. The images run on RAM of the remote server. Thus, when the remote server is off, there is no data to extract from a boot image. Also, since the image is fetched on each boot, there is no way to add faulty data to the system. Thus, a secret attack cannot occur.

To overcome the third mentioned problem in the background section (i.e., an interception attack), the methods and systems can rely on a mutually authenticated secure channel to download images and configuration information for the booting remote server. The threat actor cannot intercept the data inflight to view or change the data in such a channel. Since authentication is performed in both directions, the image server cannot deliver data to invalid remote servers and the booting system cannot accept images from invalid servers.

To overcome the fourth mentioned problem in the background section (i.e., a compromised running system that is trusted by the infrastructure), attestation of the hardware, the firmware, and/or the operating system of the remote server can remedy such an issue. The methods and systems can use the TPM of the remote server as a root of trust sealing initial keys of the remote server for attestation.

In short, the methods and systems combine security techniques into a solution that is related to a diskless boot. The techniques and the diskless boot address a threat actor physically accessing a part of the network or a remote server while it is offline and a threat actor intercepting secret data between the remote server and the infrastructure of the distribution network while the remote server is online.

To overcome the fifth mention problem in the background section (i.e., reliance on the trustworthiness of an external image source for the diskless boot), the systems and methods can use a secure cryptoprocessor as a trusted root, such as a TPM, and a client-server environment that can boot a software assembly (retrieved from a network) on client-server environment enabled clients, such as iPXE. Additionally, in some embodiments, the systems and methods can extend the client-server environment with a trusted bootloader, such as extending iPXE with Grand Unified Bootloader (GRUB), to address the dependency on the trustworthiness of the image source. Also, the environment and the bootloader are immutable in some embodiments, which prevent or at least limit security breaches of these mechanisms.

In accordance with one or more embodiments, this disclosure provides computerized methods for secure booting and re-booting using at least a combination of a client-server environment that boots a software assembly (retrieved from a network) on client-server environment enabled clients, and a secure cryptoprocessor to assure the integrity of the client-server environment, as well as a non-transitory computer-readable storage medium for carrying out technical steps of the computerized methods. The non-transitory computer-readable storage medium has tangibly stored thereon, or tangibly encoded thereon, computer readable instructions that when executed by one or more devices (e.g., image server, remote server, client device, and the like) cause at least one processor to perform a method for a novel and improved secure booting and re-booting using at least a combination of a client-server environment that boots a software assembly (retrieved from a network) on client-server environment enabled clients, and a secure cryptoprocessor to assure the integrity of the client-server environment.

In accordance with one or more embodiments, a system is provided that includes one or more computing devices configured to provide functionality in accordance with one or more embodiments of a novel and improved secure booting and re-booting using at least a combination of a client-server environment that boots a software assembly (retrieved from a network) on client-server environment enabled clients, and a secure cryptoprocessor to assure the integrity of the client-server environment.

In accordance with one or more embodiments, functionality is embodied in steps of a method performed by at least one computing device. In accordance with one or more embodiments, program code (or program logic) executed by processor(s) of a computing device to implement functionality in accordance with one or more embodiments described herein is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DESCRIPTION OF EMBODIMENTS

The present disclosure will now be described more fully hereinafter with reference to the accompanying drawings, which form a part hereof, and which show, by way of illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium can include computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid-state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers can vary widely in configuration or capabilities, but generally a server can include one or more central processing units and memory. A server can also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that can couple devices so that communications can be exchanged, such as between a server and a client device or other types of devices, including between wireless devices coupled via a wireless network, for example. A network can also include mass storage, such as network attached storage (NAS), a storage area network (SAN), or other forms of computer or machine-readable media, for example. A network can include the Internet, one or more local area networks (LANs), one or more wide area networks (WANs), wire-line type connections, wireless type connections, cellular or any combination thereof. Likewise, sub-networks, which can employ differing architectures or can be compliant or compatible with differing protocols, can interoperate within a larger network. Various types of devices can, for example, be made available to provide an interoperable capability for differing architectures or protocols. As one illustrative example, a router can provide a link between otherwise separate and independent LANs.

A communication link or channel can include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as can be known to those skilled in the art. Furthermore, a computing device or other related electronic devices can be remotely coupled to a network, such as via a wired or wireless line or link, for example.

A computing device can be capable of sending or receiving signals, such as via a wired or wireless network, or can be capable of processing or storing signals, such as in memory as physical memory states, and can, therefore, operate as a server. Thus, devices capable of operating as a server can include, as examples, dedicated rack mounted servers, desktop computers, laptop computers, set top boxes, integrated devices combining various features, such as two or more features of the foregoing devices, or the like. Servers can vary widely in configuration or capabilities, but generally a server can include one or more central processing units and memory. A server can also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device can include a computing device capable of sending or receiving signals, such as via a wired or a wireless network. A client device can, for example, include a desktop computer or a portable device, such as a cellular telephone, a smart phone, a display pager, a radio frequency (RF) device, an infrared (IR) device, an NFC device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device can vary in terms of capabilities or features. Claimed subject matter is intended to cover a wide range of potential variations. For example, a simple smart phone, phablet or tablet can include a numeric keypad or a display of limited functionality, such as a monochrome liquid crystal display (LCD) for displaying text. In contrast, however, as another example, a web-enabled client device can include a high-resolution screen, one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device can include or can execute a variety of operating systems, including a personal computer operating system, such as a Windows, iOS or Linux, or a mobile operating system, such as iOS, Android, or Windows Mobile, or the like.

A client device can include or can execute a variety of possible applications, such as a client software application enabling communication with other devices, such as communicating one or more messages, such as via email, for example Yahoo! ® Mail, short message service (SMS), or multimedia message service (MMS), for example Yahoo! Messenger®, including via a network, such as a social network, including, for example, Tumblr®, Facebook®, LinkedIn®, Twitter®, Flickr®, or Google+®, Instagram™, to provide only a few possible examples. A client device can also include or execute an application to communicate content, such as, for example, textual content, multimedia content, or the like. A client device can also include or execute an application to perform a variety of possible tasks, such as browsing, searching, playing, streaming or displaying various forms of content, including locally stored or uploaded images and/or video, or games (such as fantasy sports leagues). The foregoing is provided to illustrate that claimed subject matter is intended to include a wide range of possible features or capabilities.

The systems and methods disclosed herein can provide a secure remote boot process leveraging (1) a client-server environment that boots a software assembly (retrieved from a network) on client-server environment enabled clients, and (2) a secure cryptoprocessor to assure the integrity of the client-server environment and to provide a root of trust in communication with a trusted data center. Some examples disclosed herein use transport layer security (TLS) mutual authentication to provide a mutually authenticated channel. In different combinations these technologies can address the security concerns of deployments of application and content distribution networks.

An example of a client-server environment that can boot a software assembly (retrieved from a network) on client-server environment enabled clients is a preboot execution environment (PXE). PXE is a client-server environment that boots a software assembly, retrieved from a network, on PXE-enabled clients. On the client side it uses a network interface controller (NIC), and for the server and client, it uses a small set of network protocols such as Dynamic Host Configuration Protocol (DHCP) and Trivial File Transfer Protocol (TFTP). PXE is a common choice for operating system booting, installation and deployment.

A similar client-server environment that can be more flexible is iPXE, which is an open-source implementation of PXE. It can be used to enable computers without built-in PXE support to boot from the network, or to extend an existing PXE client implementation so it supports additional protocols. While PXE clients usually use TFTP to transfer data, iPXE client firmware can add the ability to retrieve data through other protocols, including HyperText Transfer Protocol (HTTP) and HTTP for Transport Layer Security (HTTPS).

An example secure cryptoprocessor that can assure the integrity of a client-server environment is Trusted Platform Module (TPM). TPM is a dedicated microcontroller designed to secure hardware through integrated cryptographic keys. Also, TPM can provide a random number generator. TPM can also provide the secure generation of cryptographic keys for limited uses. TPM can also provide remote attestation in that it can create a hash key summary of hardware and software configurations and software images. The software in charge of hashing the configuration and image data determines the extent of the summary. This allows a third party to verify that the software has not been changed. TPM can also provide binding in that it can encrypt data using the TPM key. TPM can also provide sealing, which is similar to binding, but in addition, specifies the TPM hash state for the data to be decrypted or unsealed. Computer programs can use a TPM to authenticate hardware devices, since each TPM chip has a unique and secret key embedded as it is initialized.

Figure 1:
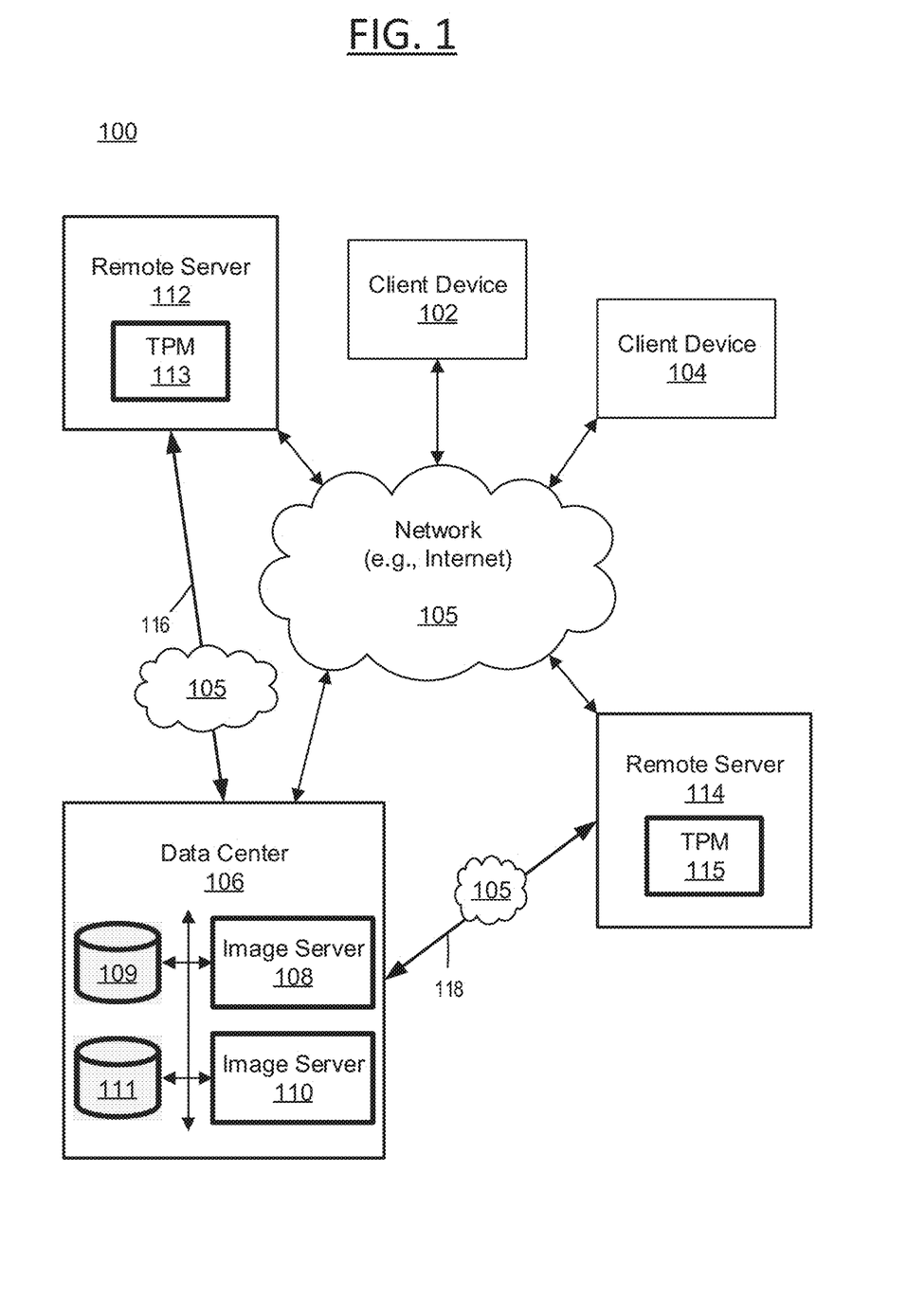
FIG. 1 is a schematic diagram illustrating an example of a network (which includes elements that can implement a secure remote boot process) within which systems and methods disclosed herein can be implemented according to some embodiments of the present disclosure.

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein can be practiced. Not all the components can be required to practice the disclosure, and variations in the arrangement and type of the components can be made without departing from the spirit or scope of the disclosure. As shown, system 100 of FIG. 1 includes local area networks ("LANs")/wide area networks ("WANs")—network 105, client devices 102 and 104 (e.g., such as handheld or mobile devices, Internet of Things devices, etc.), a data center 106 that includes image servers 108 and 110 as well as image databases 109 and 111, and remote servers 112 and 114 that each include a respective TPM (TPMs 113 and 115). Also, FIG. 1 depicts mutually authenticated secure channels 116 and 118.

Figure 4:
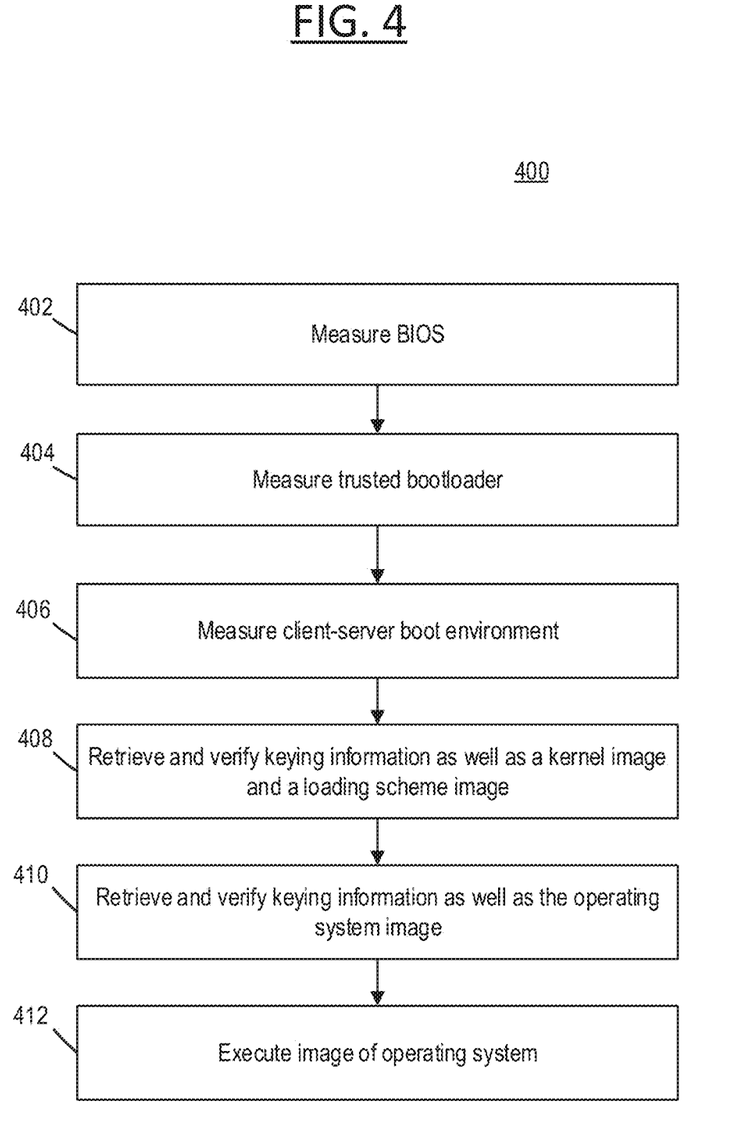
FIG. 4 is a flowchart illustrating operations that can be performed by a remote server, in accordance with some embodiments of the present disclosure.
Figure 5:
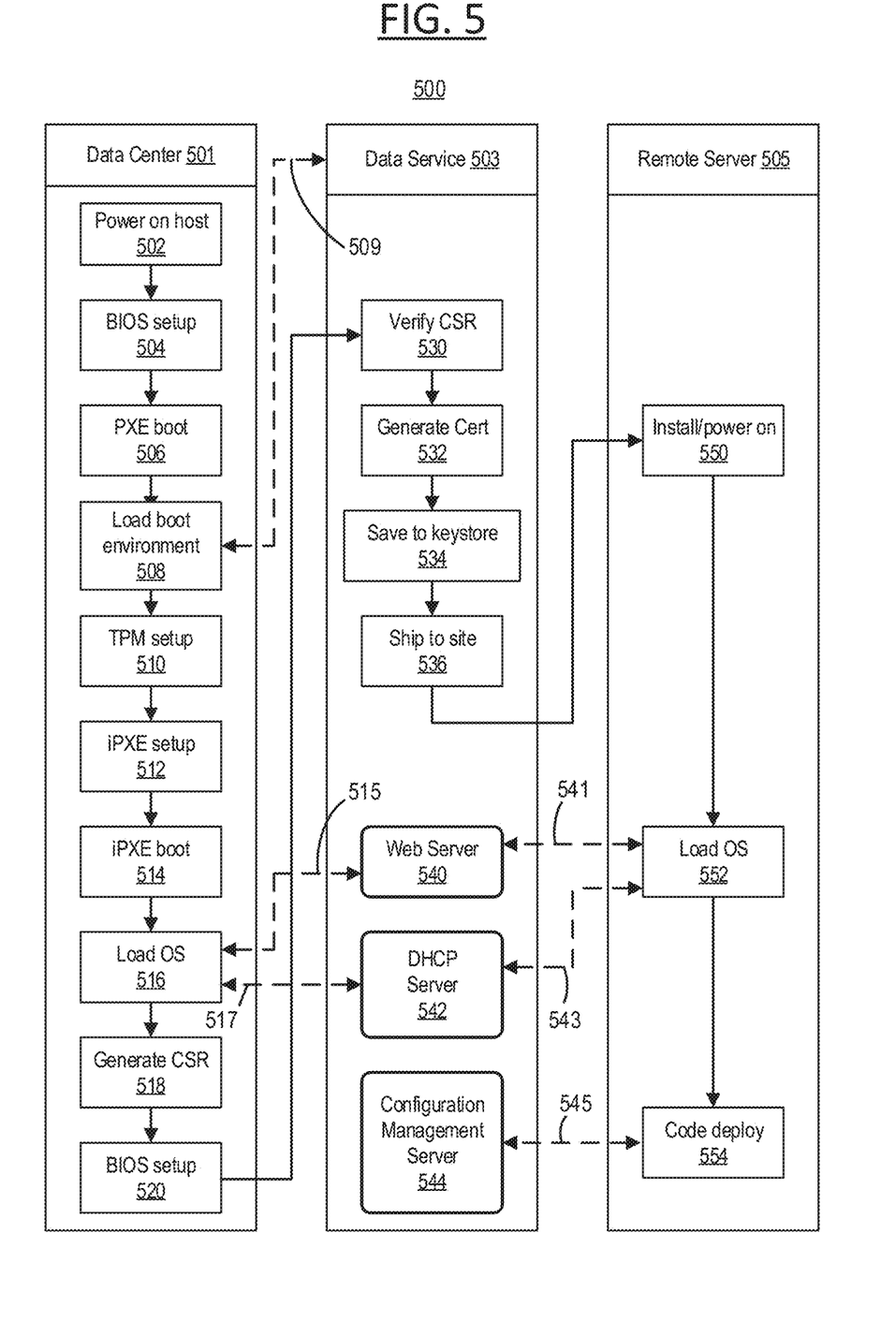
FIG. 5 is a flowchart illustrating operations that can be performed by elements of a data center, a data service, and a remote server, in accordance with some embodiments of the present disclosure.
Figure 6:
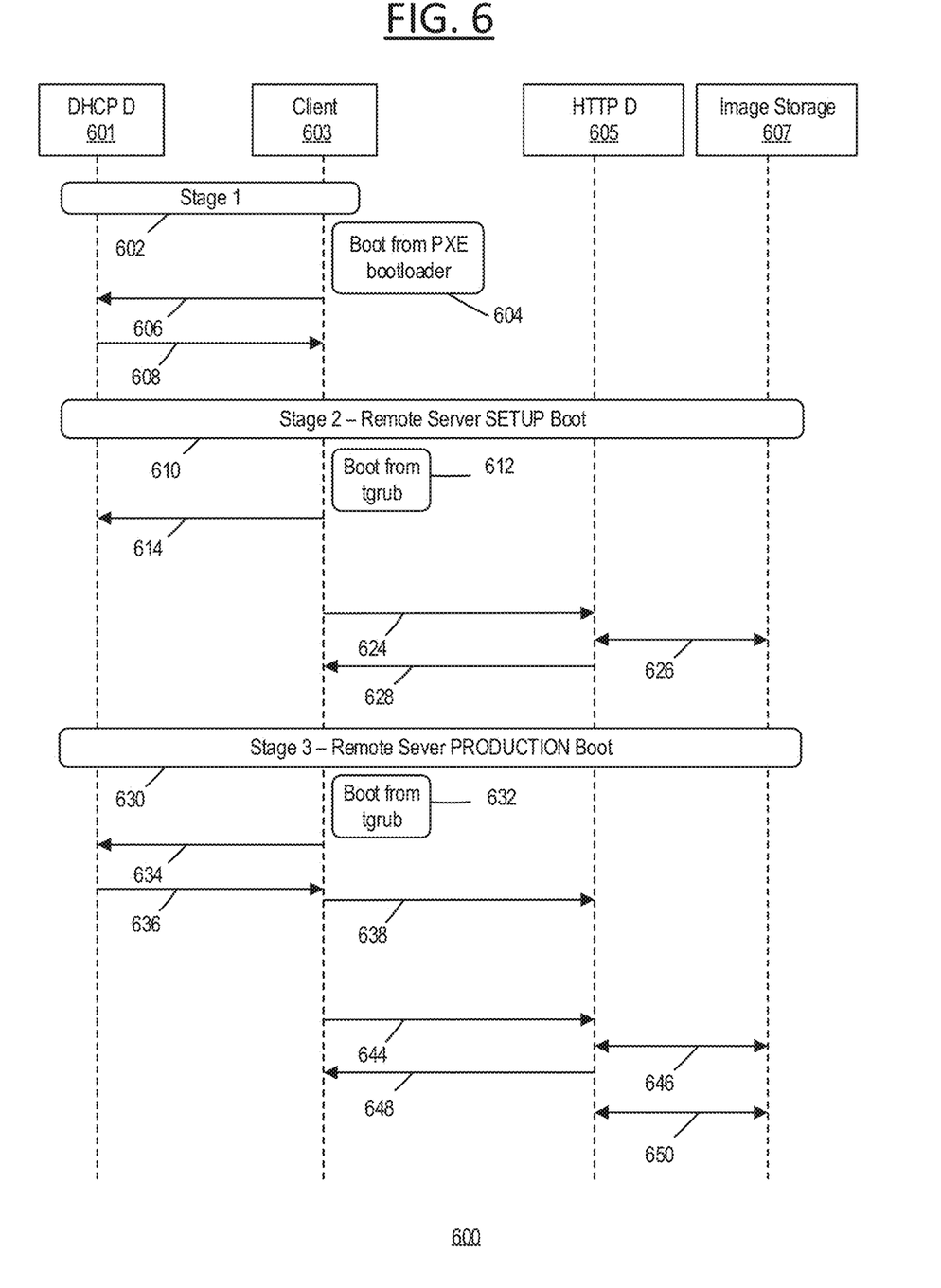
FIG. 6 is a flowchart illustrating operations that can be performed by a remote server and a source of boot and operating system images, in accordance with some embodiments of the present disclosure.

Each of the image servers 108 and 110 can include a device that includes a configuration to perform at least some of the operations of processes 400, 500, and/or 600 of FIGS. 4, 5, and 6, respectively. Each of the remote servers 112 and 114 can include a device that includes a configuration to perform at least some of the operations of processes 400, 500, and 600 of FIGS. 4, 5, and 6, respectively.

Embodiments of client devices 102 and 104, image servers 108 and 110, and remote servers 112 and 114 are described in more detail below.

Generally, client devices 102 and 104 can include virtually any computing device capable of receiving and sending a message over a network, such as network 105—which could include a wireless network—, or the like. Client devices 102 and 104 can also be mobile devices that are configured to be portable and held in a hand or two hands. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, smart watch, tablet computers, phablets, integrated devices combining one or more of the preceding devices, and the like. As such, mobile devices typically range widely in terms of capabilities and features. For example, a cell phone can have a numeric keypad and a few lines of monochrome LCD display on which only text can be displayed. In another example, a web-enabled mobile device can have a touch sensitive screen, a stylus, and an HD display in which both text and graphics can be displayed.

A web-enabled client device can include a browser application that is configured to receive and to send web pages, web-based messages, and the like. The browser application can be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Client devices 102 and 104 and the servers 108, 110, 112, and 114 can each include at least one client application that is configured to receive content or data from another computing device. The client application can include a capability to provide and receive textual content, graphical content, audio content, authentication and keying information, and the like. The client application can further provide information that identifies itself, including a type, capability, name, and the like. In one embodiment, client devices 102 and 104 and the servers 108, 110, 112, and 114 can each uniquely identify themselves through any of a variety of mechanisms. Client devices can be identifiable via a phone number, Mobile Identification Number (MIN), an electronic serial number (ESN), or another type of device identifier. Servers can be identifiable via an electronic serial number (ESN) or another type of device identifier.

In general, devices 102 and 104 and servers 108, 110, 112, and 114 can be capable of sending or receiving signals, such as via a wired or wireless network, or can be capable of processing or storing signals, such as in memory as physical memory states.

Network 105 is configured to couple devices 102 and 104 and servers 108, 110, 112, and 114 as well as the data center 106, or the like, with other computing devices. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another, and/or other computing devices.

Within the communications networks utilized or understood to be applicable to the present disclosure, such networks will employ various protocols that are used for communication over the network. Signal packets communicated via a network, such as a network of participating digital communication networks, can be compatible with or compliant with one or more protocols. Signaling formats or protocols employed can include, for example, TCP/IP, UDP, QUIC (Quick UDP Internet Connection), DECnet, NetBEUI, IPX, APPLETALK™, or the like. Versions of the Internet Protocol (IP) can include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets can be communicated between nodes of a network, such as, for example, to one or more sites employing a local network address. A signal packet can, for example, be communicated over the Internet from a user site via an access node coupled to the Internet. Likewise, a signal packet can be forwarded via network nodes to a target site coupled to the network via a network access node, for example. A signal packet communicated via the Internet can, for example, be routed via a path of gateways, servers, etc. that can route the signal packet in accordance with a target address and availability of a network path to the target address.

In some embodiments, the network 105 can include content distribution network(s) and/or application distribution network(s). A content distribution network (CDN) or an application distribution network (ADN) generally refers to a delivery system that includes a collection of computers or computing devices linked by a network or networks. A CDN or ADN can employ software, systems, protocols or techniques to facilitate various services, such as storage, caching, communication of content, or streaming media or applications. A CDN or ADN can also enable an entity to operate or manage another's site infrastructure, in whole or in part.

The remote server 112 and/or the remote server 114 can include a device that includes a configuration to provide content such as interactive content via a network to another device. Such server(s) can, for example, host a site, service or an associated application, such as, an email platform (e.g., Yahoo! ® Mail), a social networking site, a photo sharing site/service (e.g., Tumblr®), a search platform or site, or a personal user site (such as a blog, vlog, online dating site, and the like) and the like. Such server(s) can also host a variety of other sites, including, but not limited to business sites, educational sites, dictionary sites, encyclopedia sites, wikis, financial sites, government sites, and the like. Devices that can operate as such server(s) include personal computers desktop computers, multiprocessor systems, microprocessor-based or programmable consumer electronics, network PCs, servers, and the like.

The remote server 112 and/or the remote server 114 can further provide a variety of services that include, but are not limited to, streaming and/or downloading media services, search services, email services, photo services, web services, social networking services, news services, third-party services, audio services, video services, instant messaging (IM) services, SMS services, MMS services, FTP services, voice over IP (VOIP) services, or the like. Such services, for example a mail application and/or email-platform, can be provided via the application server 108, whereby a user is able to utilize such service upon the user being authenticated, verified or identified by the service. Examples of content can include videos, text, audio, images, or the like, which can be processed in the form of physical signals, such as electrical signals, for example, or can be stored in memory, as physical states, for example.

Also, the remote server 112 and/or the remote server 114 can include an ad server such as a server that stores online advertisements for presentation to users. "Ad serving" provided by an ad server refers to methods used to place online advertisements on websites, in applications, or other places where users are more likely to see them, such as during an online session or during computing platform use, for example. Various monetization techniques or models can be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is advertisers will pay higher advertising rates when they believe their ads are being placed in or along with highly relevant content that is being presented to users. Reductions in the time needed to quantify a high-quality ad placement offers ad platforms competitive advantages. Thus, higher speeds and more relevant context detection improve these technological fields.

Servers 108, 110, 112, and 114 can be capable of sending or receiving signals, such as via a wired or wireless network, or can be capable of processing or storing signals, such as in memory as physical memory states. Devices capable of operating as a server can include, as examples, dedicated rack-mounted servers, desktop computers, laptop computers, set top boxes, integrated devices combining various features, such as two or more features of the foregoing devices, or the like. Servers can vary widely in configuration or capabilities, but generally, a server can include one or more central processing units and memory. A server can also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In some embodiments, users are able to access services provided by the remote server 112 and/or the remote server 114. This can include in a non-limiting example, authentication servers, search servers, email servers, social networking services servers, SMS servers, IM servers, MMS servers, exchange servers, photo-sharing services servers, and travel services servers, via the network 105 using their various client devices. In some embodiments, applications, such as a mail or messaging application (e.g., Yahoo!® Mail, Yahoo!® Messenger), a photo sharing/user-generated content (UGC) application (e.g., Flickr®, Tumblr®, and the like), a streaming video application (e.g., Netflix®, Hulu®, iTunes®, Amazon Prime®, HBO Go®, and the like), blog, photo or social networking application (e.g., Facebook®, Twitter® and the like), search application (e.g., Yahoo!® Search), and the like, can be hosted by the remote server 112 and/or the remote server 114. Thus, the remote server 112 and/or the remote server 114 can store various types of applications and application related information including application data and user profile information (e.g., identifying and behavioral information associated with a user). It should also be understood that the remote server 112 and/or the remote server 114 can also store various types of data related to content and services provided by an associated database. Embodiments exist where the network 105 is also coupled with/connected to a Trusted Search Server (TSS) which can be utilized to render content in accordance with the embodiments discussed herein. Embodiments exist where the TSS functionality can be embodied within the remote server 112 and/or the remote server 114.

Moreover, although FIG. 1 illustrates servers 108, 110, 112, and 114 as single computing devices, respectively, the disclosure is not so limited. For example, one or more functions of servers 108, 110, 112, and 114 can be distributed across one or more distinct computing devices. Moreover, in one embodiment, servers 108, 110, 112, and 114 can be integrated into a single computing device, without departing from the scope of the present disclosure.

Figure 2:
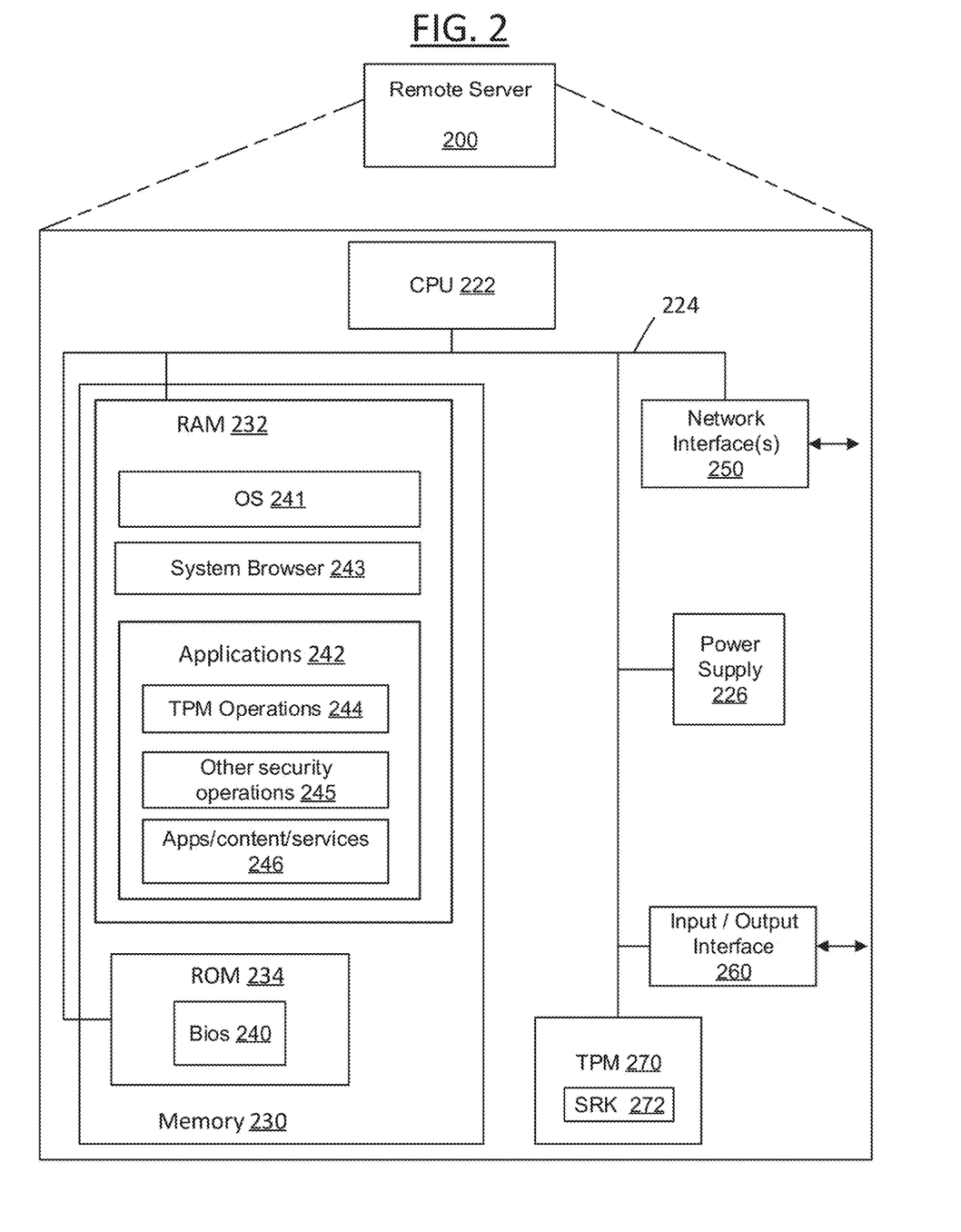
FIG. 2 depicts is a schematic diagram illustrating an example of a remote server (such as remote server 112 or remote server 114), in accordance with some embodiments of the present disclosure.

FIG. 2 is a schematic diagram illustrating a remote server showing an example embodiment of a remote server that can be used within the present disclosure. Remote server 200 can include many more or less components than those shown in FIG. 2. However, the components shown are sufficient to disclose an illustrative embodiment for implementing some aspects the present disclosure. Remote server 200 can represent, for example, remote servers discussed above in relation to FIG. 1.

As shown in the figure, remote server 200 includes a processing unit (CPU) 222 in communication with a mass memory 230 via a bus 224. Remote server 200 also includes a power supply 226, one or more network interfaces 250, an input/output interface 260 (which can include an audio interface, a display, a keypad, an illuminator, a global positioning systems (GPS) receiver, sensors, and an input/output interface to such devices), and a TPM 270.

Power supply 226 provides power to remote server 200. A rechargeable or non-rechargeable battery can be used to provide power. The power can also be provided by an external power source, such as an AC adapter or a powered docking cradle that supplements and/or recharges a battery. Remote server 200 can optionally communicate with a base station (not shown), or directly with another computing device. Network interface 250 includes circuitry for coupling remote server 200 to one or more networks, and is constructed for use with one or more communication protocols and technologies as discussed above. Network interface 250 is sometimes known as a transceiver, transceiving device, or network interface card (NIC). The input/output interface 260 can be used for communicating with external devices. Input/output interface 260 can utilize one or more communication technologies, such as USB, infrared, Bluetooth™, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of server 200. The mass memory also stores an operating system 241 in RAM 232 for controlling the operation of server 200. It will be appreciated that this component can include a general-purpose operating system such as a version of UNIX, or LINUX™, or a specialized client communication operating system such as Windows Client™, or the Symbian® operating system. The operating system can include, or interface with a Java virtual machine module that enables control of hardware components and/or operating system operations via Java application programs. The mass memory also stores a system browser in RAM 232 for controlling operations of a system browser 243 and applications 242, such as TPM operations 244, other security operations 245, and applications, content, and/or services 246 to be served.

Memory 230 further includes one or more data stores, which can be utilized by server 200 to store, among other things, the system browser 243, the applications 242 and/or other data. For example, data stores can be employed to store information that describes various capabilities of server 200. The information can then be provided to another device based on any of a variety of events, including being sent as part of a header during a communication, sent upon request, or the like. At least a portion of the capability information can also be stored on a disk drive or other storage medium (not shown) within server 200.

Applications 242 can include computer executable instructions which, when executed by server 200, transmit, receive, and/or otherwise process text, audio, video, images, and enable telecommunication with other servers and/or another user of another client device. Examples of application programs or "apps" in some embodiments include browsers, calendars, contact managers, task managers, transcoders, photo management, database programs, word processing programs, security applications, spreadsheet programs, games, search programs, and so forth.

The applications, content, and/or services 246 can include a search client that is configured to send, to receive, and/or to otherwise process a search query and/or search result using any known or to be known communication protocols. It should be clear that multiple search clients can be employed by applications, content, and/or services 246. For example, one search client can be configured to enter a search query message, where another search client manages search results, and yet another search client is configured to manage serving digital content (e.g., advertisements) or other forms of digital data associated with, but not limited to, IMs, emails, and other types of known messages, or the like. Each search client can be implemented by a separate one of applications, content, and/or services 246.

Figure 3:
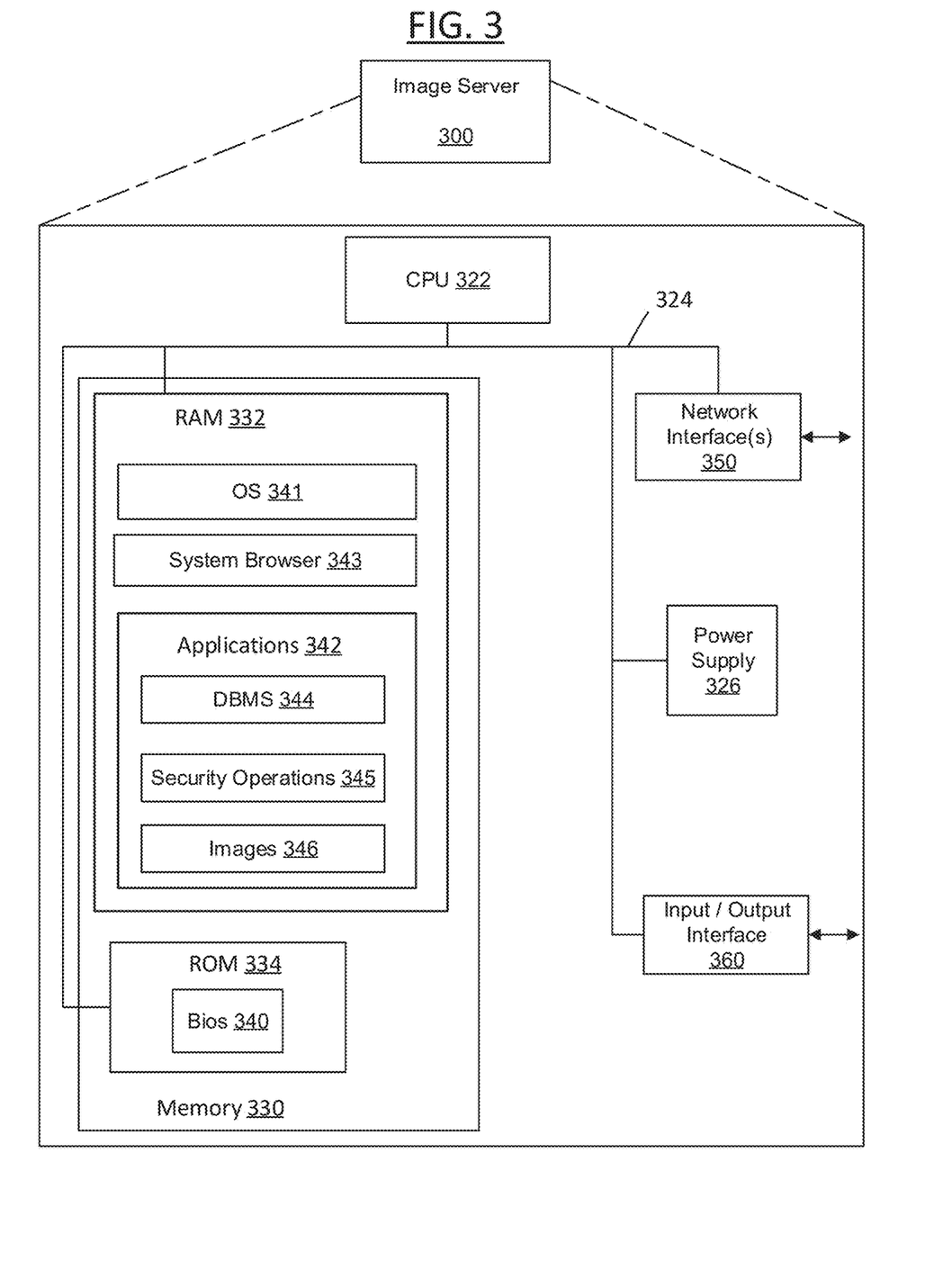
FIG. 3 depicts is a schematic diagram illustrating an example of an image server (such as image server 108 or image server 110), in accordance with some embodiments of the present disclosure.

FIG. 3 is a schematic diagram illustrating an image server showing an example embodiment of an image server that can be used within the present disclosure. Image server 300 can include many more or less components than those shown in FIG. 3. However, the components shown are sufficient to disclose an illustrative embodiment for implementing some aspects the present disclosure. Image server 300 can represent, for example, image servers discussed above in relation to FIG. 1.

As shown in the figure, image server 300 includes a processing unit (CPU) 322 in communication with a mass memory 330 via a bus 324. Image server 300 also includes a power supply 326, one or more network interfaces 350, an input/output interface 360 (which can include an audio interface, a display, a keypad, an illuminator, a global positioning systems (GPS) receiver, sensors, and an input/output interface to such devices). Power supply 326 provides power to image server 300. A rechargeable or non-rechargeable battery can be used to provide power. The power can also be provided by an external power source, such as an AC adapter or a powered docking cradle that supplements and/or recharges a battery. Image server 300 can optionally communicate with a base station (not shown), or directly with another computing device. Network interface 350 includes circuitry for coupling image server 300 to one or more networks, and is constructed for use with one or more communication protocols and technologies as discussed above. Network interface 350 is sometimes known as a transceiver, transceiving device, or network interface card (NIC). The input/output interface 360 can be used for communicating with external devices. Input/output interface 360 can utilize one or more communication technologies, such as USB, infrared, Bluetooth™, or the like.

Mass memory 330 includes a RAM 332, a ROM 334, and other storage means. Mass memory 330 illustrates another example of computer storage media for storage of information such as computer readable instructions, data structures, program modules or other data. Mass memory 330 stores a basic input/output system ("BIOS") 340 for controlling low-level operation of server 300. The mass memory also stores an operating system 341 in RAM 332 for controlling the operation of server 300. It will be appreciated that this component can include a general-purpose operating system such as a version of UNIX, or LINUX™, or a specialized client communication operating system such as Windows Client™, or the Symbian® operating system. The operating system can include, or interface with a Java virtual machine module that enables control of hardware components and/or operating system operations via Java application programs. The mass memory also stores a system browser in RAM 332 for controlling operations of a system browser 343 and applications 342, such as a database management system (DBMS) 344, security operations 345, and images 346 to be served to remote servers.

Memory 330 further includes one or more data stores, which can be utilized by server 300 to store, among other things, the system browser 343, the applications 342 and/or other data. For example, data stores can be employed to store information that describes various capabilities of server 300. The information can then be provided to another device based on any of a variety of events, including being sent as part of a header during a communication, sent upon request, or the like. At least a portion of the capability information can also be stored on a disk drive or other storage medium (not shown) within server 300.

Applications 342 can include computer executable instructions which, when executed by server 300, transmit, receive, and/or otherwise process text, audio, video, images, and enable telecommunication with other servers and/or another user of another client device. Examples of application programs or "apps" in some embodiments include browsers, calendars, contact managers, task managers, transcoders, photo management, database programs, word processing programs, security applications, spreadsheet programs, games, search programs, and so forth.

Referring back to FIG. 2, the TPM 270 provides a trusted root to securely bootstrap the remote server 200. The TPM 270 is a secure co-processor mounted on the motherboard of the server 200. The TPM 270 has storage for root keys, and it is capable of performing basic cryptographic operations (such as RSA, AES, and SHA1). The root keys are unique per each TPM 270 of each remote server 200, and the root keys are cleared when a new entity takes ownership of the TPM 270.

The TPM 270 can include a storage root key (SRK) 272 stored in the TPM to create a key pair that is only valid for the remote server 200. The TPM 270 creates the key pair and encrypts the private key with the SRK 272 for the TPM. The remote server 200 will be able to re-import and use the key pair, but no other remote server will be able to use that key pair since no other server's TPM will have the same SRK.

Before the remote server 270 is shipped out, the TPM 270 is initialized and a key pair is created for the remote server. A client certificate is created from the key pair public key, and it is registered in an image database for the remote server (such as one of image databases 109 or 111 illustrated in FIG. 1). When the remote server 270 issues a network request (such as an HTTPS request) for the image, the image server 300 and the remote server 200 will use mutual authentication (such as TLS mutual authentication) to maintain integrity of the system. If the remote server 200 does not respond correctly with the expected keying information, the image server 300 will refuse to complete the connection and will not provide the requested image. Therefore, if the remote server 200 is untrustworthy, the image server 300 will not provide the remote server the requested image. This protects possibly sensitive information in the image from invalid acquisition by an invalid remote server.

The system described herein can use a client-server environment that boots a software assembly (retrieved from a network) on a remote server (such as iPXE) to fetch and boot into a diskless image. The environment can be extended to add support for secure cryptoprocessor operations (such as TPM operations) to load keys and perform signing operations with the loaded keys.

The environment can include a boot script (such as an iPXE boot script). The first step of the script can include fetching a client certificate and a client private key that is associated with the remote server. Since the client certificate is public information and the client private key is encrypted with the remote server's SRK it is not critical that such keying information is only provided to trusted sources. After the keying information is fetched, it is loaded into the remote server's TPM and is available to perform cryptographic operations.

The boot script can make secure network requests (such as HTTPS requests) for the kernel and operating system images (e.g., initramfs and squashfs). The image servers use mutual authentication, so the server is issued challenges via a handshake (such as a TLS handshake) that can be answered if the remote server has successfully loaded the client private key. The environment image can be compiled with root certificates from the image server or the trusted data center, so it can verify the image server certificates provided during the TLS handshake. Accordingly, the remote server can verify the image server certificate to ensure that it is downloading an image from a legitimate source.

In some embodiments, one or more network interface cards of the remote server can be reflashed with the client-server environment (such as with the iPXE). Alternatively, in some examples GRUB, such as GRUB version 2, can be used to load the environment. Other bootloaders can be used as well to load the boot environment. One of the advantages of GRUB version 2 is that it adds support for TPM.

The installations of the trusted bootloader (such as GRUB) and preboot execution environment (such as iPXE) are immutable in some embodiments. If either of these components are mutated, such a mutation can be detected. Also, the components can be disabled if they are detected as mutated. This could be achieved by loading the components into ROM or by using the integrity controls via a PCR mechanism of the TPM.

In some embodiments, both the bootloader and the client-server boot environment are stored on a disk or computer-readable medium of the remote server. A secure cryptoprocessor (such a TPM) in combination with a trusted bootloader (such as GRUB version 2) can enforce integrity proofs. FIG. 4 illustrates the secure remote boot steps that implement the integrity proof.

In addition to encryption operations, the secure cryptoprocessor can provide a mechanism for checking integrity via a fixed set of platform control registers (PCRs). In some embodiments, the PCRs are 20-byte registers that are set to 0 on reboot. Some of the PCRs (such as the majority of the PCRs) cannot be cleared after reboot. Instead PCRs can be extended with 20-byte values (such as generally the hash of a file). The extension operation can be or include PCRx=SHA1(PCRx||extension_value). The hashes of files can be computed and added to a PCR. A benefit of such examples is that an attacker could also update a PCR, but computing the extension value needed to make an already set PCR reach a particular value is very hard since SHA1 is a cryptographic hash function. In such embodiments, the BIOS (such as BIOS 240 of remote server 200) can set a PCR (such as PCR 4) to the hash of the boot loader. Trusted boot loader can update another PCR (such as PCR 12) with the hash of the boot environment's binary file.

The secure cryptoprocessor can provide a sealing operation, which provides a measure of integrity enforcement. Sealed data is encrypted with a root key of the secure cryptoprocessor (such as the SRK of a TPM) and associated with one or more PCR IDs and expected values. The cryptoprocessor can decrypt the data if the sealed PCRs contain the specified values. If a chain of integrity measurements exists from the static root of trust for measurements (SRTM) in the cryptoprocessor to the client-server boot environment, the client keys can be sealed to enforce against a threat actor changing the boot path.

The remote server's private key can be sealed to PCRs, such as PCRs 4 and 12. If the remote server does not boot through the expected version of the trusted bootloader, the value of respective PCR (such as PCR 4) will differ. If the remote server does not boot through the expected version of the boot environment, the value of the respective PCR (such as PCR 12) will differ. In either case, the sealing constraints will not be met, and the client's private key will not be loaded. The remote server cannot perform the mutual authentication (such as TLS mutual authentication) with the image server and the images will not be downloaded to the remote server. Therefore, the combination of the BIOS and trusted bootloader setting PCRs and sealed keys can provide integrity guarantees from changes to a trusted bootloader and boot environment on the disk or in RAM.

Having described components of the architecture employed within the disclosed systems and methods, the components' operations with respect to the disclosed systems and methods will now be described below with reference to FIGS. 4-6.

Turning to FIG. 4, process 400 details steps performed by a remote server accordance with some embodiments of the present disclosure for booting or rebooting the remote server. The process 400 implements a secure remote boot that implements the integrity proof.

Process 400 begins with step 402, which includes a part of the remote server measuring the BIOS of the remote sever (such as BIOS 240 of remote server 200) into a platform control register (PCR), such as PCR 0—which holds the static root of trust for measurement. In step 404, a part of the remote server measures a trusted bootloader for the remote server (e.g., trusted GRUB) into a PCR, such as PCR 4. In step 406, a part of the remote server measures a client-server environment element (such as an iPXE element) into a PCR, such as PCR 12. The client-server environment can boot a software assembly that is retrieved from a network. It can boot the software assembly on client-server environment enabled clients, such as the remote server.

In step 408, a part of the remote server fetches a client key pair, loads the client private key of the key pair, and checks (such as by the cryptoprocessor) the private key against the respective PCRs holding the trusted bootloader and the client-server element, such as PCRs 4 and 12. Also, a part of the remote server fetches an image of a kernel and an image of a scheme for loading a temporary root file system into memory (such as an image of initramfs or initrd). The images can be used as part of the operating system startup process. Also, the images can be used to prepare the remote server for loading the operating system before the real root file system is mounted in the remote server.

In step 410, a part of the remote server loads the client key pair and checks the key pair against the respective PCRs holding the trusted bootloader and the client-server element, such as PCRs 4 and 12. Also, a part of the remote server fetches an image of the operating system (such as an image of squashfs). Step 410 also occurs through mutual authentication, such as TLS mutual authentication. In other words, the fetching of the image of the operating system occurs through a mutually authenticated channel. In step 412, a part of the remote server executes the image of the operating system.

In general, deploying secure remote servers (such as remote server 200) includes multiple stages with each stage having multiple steps. FIG. 5 shows a specific flow diagram of example steps to initialize and deploy the remote servers using certain technologies as examples. FIG. 6 shows the details of machine and network operations during setup of the remote server and a production boot of the remote server using certain technologies as examples.

In general, first the remote servers are initialized at a secure data center, such as data center 106 illustrated in FIG. 1 or data center 501 illustrated in FIG. 5. The data center is located at a trusted secure physical site. The TPM (such as TPM 270) of each remote server is initialized, a server-specific key pair is created, and a trusted bootloader (such as a trusted GRUB) and a client-server boot environment (such as iPXE) are loaded on storage medium (such as a storage disk) of each remote server to be deployed. A certificate signing request (CSR) can also be created on the remote server from the new key pair.

The data center can be a secure site for housing the image servers and databases. The image databases and servers can host and provide the images to the remote servers upon requests for the images via mutual authentication between the parts of the data center and the remote servers. The resulting remote server certificate and encrypted private key are registered and made accessible through the image server running at the data center. The keying and authentication information as well as the images can be managed and stored by the image databases.

In general, after initialization, the remote servers are physically sent to the deployment sites. The deployment sites can be completely insecure or partially insecure. Typically, personnel, from different companies from the company providing the data center, install and deploy the remote server at the remote site. Thus, the possibility of insecurity. It other words, it is common for contractors to install the remote servers at the remote site, and therefore there can be security issues.

When the remote server is powered on, a trusted bootloader (such as a trusted GRUB) is invoked and loads a client-server environment (such as iPXE) that boots a software assembly (retrieved from a network) on the remote server via a client-server environment enabled client installed in the remote server. The environment issues a request, such as a DHCP request. A router associated with the remote server at the remote site, communicatively coupled to the server, can relay the request back to the data center at the secure site. A server at the data center (such as a DHCP server, which can be a part of the image server) can return the address for the remote server and a URL to a boot script of the client-server environment.

As mentioned herein, an attacker of the system can have access to insert a rogue router or server (such as a rogue DHCP server) to answer the remote server requests (such as its DHCP requests). Such attacks by a threat actor could lead to an invalid image being sent to the remote server. But, the sensitive information of valid images can still be secure from the attacker. However, because the resulting image from the attacker would not have the keying information from the initial state of the setup of the remote servers, the invalid image is rejected by the remote server. Alternatively, a rogue server could try to setup a man-in-the-middle attack, but that can be prevented by the mutual authentication (such as TLS mutual authentication).

In general, once the remote server has a link, such as a URL, for the client-server environment boot script (e.g., iPXE boot script), it can fetch images and boot into its RAM. This general solution allows for deployment in multiple locations around the world in less trusted deployment sites. This general solution enables the provider of the remote servers to send servers internationally over great distances without worrying whether the physical memory of the deployed remote servers will be read or replaced as well as worrying over changes to disks or other non-volatile memory.

In general, the TPM provides the root of trust to create a trustworthy path to servers and databases of the trusted data center. The general solution can be used in conjunction with other mechanisms to detect and protect against attacks on running systems. Since the solution can be diskless, attempts to access the disk outside of the standard boot process will fail. Thus, many types of attacks on the remote server, the trusted data center, or in between will fail. In some embodiments, no operating system data is stored in the permanent memory or disk of the remote server. The TPM provides attestation of the limited amount of data in the permanent memory or the disk. The general solution solves the problems described herein and additional problems with remote booting not described herein.

In FIG. 5, process 500 details steps performed by at least one of a remote server and an image server accordance with some embodiments of the present disclosure for booting or rebooting the remote server. The steps of process 500 are shown using specific technologies; however, it is to be understood that such technologies can be replaced by alternative equivalent technologies. FIG. 5 illustrates an example process for booting or rebooting the remote server using certain example technologies. Servers 540, 542, and 544 can be part of the implementation of some of the steps of FIG. 5. However, the majority of the steps of FIG. 5 are implemented by technologies running on the remote server either during setup of the server or deployment of the operating system, applications, content, or services of the remote server.

Process 500 begins with step 502, which includes powering on the remote server in a trusted data center 501. The steps 502-520 that are implemented in the data center 501, at least in part by the remote server, are part of the setting up of the remote server before it is shipped off to a remote physical site, such as remote site 505.

In step 504, a console can provide the setting up of the BIOS of the remote server (such as BIOS 240 of remote server 200). Setting up the BIOS can include enabling the TPM of the remote server (such as TPM 270), enabling the pre-boot measurements, and setting a password or token for the BIOS of the remote server. Also, the setting up BIOS can include configuring the boot sequence.

In step 506, the network interface card on the remote server supports a PXE boot that pre-boots the remote server. In step 506 the PXE boot is obtained through a network (such as network 105 depicted in FIG. 1) from a data service 503 that can include an image server (such as one of image servers 108 or 110). During the setup at step 506, the remote server boots through the PXE image embedded in the network interface card and then chain boots to an iPXE image that it retrieves via the TFTP server that the DHCP response points it to.

In step 508, HTTP or SSH client supports loading the iPXE and the trusted GrUB images to the remote server. In this step, the operator is loading Trusted Grub and iPXE into a disk or burning iPXE image into the network interface. Images of the trusted GRUB and the iPXE are obtained through the network via a secure channel (such as via SSH or HTTPS). Communication 509 (such as via SSH or HTTPS) can include the negotiation between the remote server at the data center 501 and the data service 503.

In step 510, a part of the remote server sets up the TPM of the remote server. This step can include clearing the TPM for its configuration prior to deployment to a remote side. This step can also include generating and setting password and/or tokens for the TPM. This step also activates the TPM of the remote server and generates the root keys unique to the TPM.

In step 512, the iPXE and Trusted Grub are set on the remote server.

In step 512, the iPXE boots from a computer readable medium of the remote server, such as the hard disk drive of the remote server. The booting of the iPXE can also include the measuring of iPXE into one or more PCRs of the remote server.

In step 516, the remote server loads its operating system using iPXE boot images that are obtained from a web server 540 (which can be an image server) over communication 515. Communication 515 (which can be through HTTPS) can include the negotiation between the remote server at the data center 501 and the web server 540 of the data service 503. Communication 517 can include the negotiation between the remote server and the DHCP server 542. Step 516 occurs at data center 501, which is a secure site.

In step 518, the CSR is generated for the TPM at the data center 501. This step can also include generating the private key of the key pair for the TPM.

In step 520, the BIOS configuration is adjusted to be appropriate for the production environment. This many include updating the boot sequence options to be appropriate for the iPXE installation.

The steps 530-536 that are implemented by the data service 503 are part of the setting up and verification of authenticity of the remote server before it is shipped off to a remote physical site, remote site 505. In step 530, the CSR is verified by the data service 503. In step 532, the remote server certificate is generated by the data service 503. And, in step 534, the certificate is stored to a keystore of the data service 503 along with the encrypted private key of the key pair associated with the TPM of the remote server. The aforesaid keying information can be retrieved by the remote server at the data center 501 and at the remote site 505 via the web server 540. The communications 515 and 541 (which can be through HTTPS) are negotiations between the remote server (which is at the data center 501 or the remote site 506) and the web server 540 of the data service 503. In step 536, the data service 503 supports the shipment of the remote server to the remote site 505.

The steps 550-554 are implemented in the remote site 505, which may be an insecure site. The steps 505-554 are implemented at least in part by the remote server and are part of the deployment of the remote server at the remote physical site, remote site 505. In step 550 the remote server is installed at the remote site 505 and powered on.

In step 552, the remote server loads its operating system using iPXE obtained from a web server 540 over communication 541. Communication 541 (which can be through HTTPS) can include the negotiation between the remote server at the remote site 505 and the web server 540 of the data service 503. Communication 543 can include the negotiation between the remote server and the DHCP server 542. Step 552 occurs at remote site 505, which may be an insecure site. Finally, in step 554, code stored and retrieved by the remote server is deployed by the server. Further setting up of the remote server and management of the deployment of the remote server can be supported by configuration server 544, which is part of the data service 503. Communication 545 (which can be via HTTPS) can include the negotiation between the remote server at the remote site 505 and the configuration management server 544 of the data service 503.

Turning to FIG. 6, process 600 details steps performed by a remote server and a source of boot and operating system images (i.e., image storage 607), in accordance with some embodiments of the present disclosure, for booting or rebooting the remote server. Also, FIG. 6 illustrates operations that can be performed by a Dynamic Host Configuration Protocol (DHCP) daemon 601, a remote boot client 603, and a Hypertext Transfer Protocol (HTTP) daemon 605, in accordance with some embodiments of the present disclosure. The steps of process 600 are shown using specific technologies; however, it is to be understood that such technologies can be replaced by alternative equivalent technologies. FIG. 6 illustrates an example process for booting or rebooting the remote server using certain example technologies. DHCP daemon 601, remote boot client 603, HTTP daemon 605, and image storage 607 (which can include one or more image servers and image databases such as those illustrated in FIG. 1) implement the steps of FIG. 6.

Step 602 (stage 1) of process 600, includes sub-steps 604-608. Step 602 is implemented by the DHCP daemon 601 and the remote boot client 603. Step 602 includes the retrieving, by the DHCP daemon 601, the image for the PXE from servers in a trusted data center or factory for setting up the remote server. Step 602 includes setting up the BIOS, activating the TPM, and establishing a network connection between the remote server and the image storage 607. In step 604, the remote boot client 603 boots into an PXE image embedded on the network interface card. This image receives an address and the location of the iPXE image from the DHCP daemon. The remote boot client then receives the iPXE image from the TFTP server and boots into it. The remote boot client requests the boot script from the DHCP daemon, in step 606. And, then the DHCP daemon returns the boot script to the remote boot client, in step 608. The remote boot client follows the boot script to retrieve an OS image from the HTTP daemon 605. The remote boot client then boots into the OS image.

Once in the OS image, the remote boot client retrieves the iPXE and Trusted Grub images and the administrator stores those images on non-volatile storage. Step 610 (stage 2) of process 600, includes sub-steps 612-628. Step 610 is implemented by the DHCP daemon 601, remote boot client 603, HTTP daemon 605, and image storage 607 for the setup boot of the remote server while the remote server is in the secure site. Step 610 can support the steps 512, 514, and 516 illustrated in FIG. 5. Also, step 610 includes a login to the secure boot of the iPXE.

In step 612, the remote boot client 603 boots from a bootloader supported by iPXE, such as trusted GRUB. In some embodiments, the operator has installed Trusted Grub and iPXE on a disk or has flashed the network interface card with the iPXE image. Then the system is rebooted via Trusted Grub and iPXE from non-volatile storage on the remote server.

In step 614, the client requests an address and the boot script from the DHCP daemon 601.

During the running of the iPXE, in step 624, the remote boot client 603 makes a HTTPS request (GET https://url/files) to the HTTP daemon 605 to get images for booting at least the operating system of the remote server. In step 626, the HTTP daemon retrieves the boot images for at least the operating system of the remote server through a negotiation with the image storage 607. In response to the negotiation, in step 628, the boot image for at least the operating system is sent to the client from the HTTP daemon 605 to the remote boot client 603. In response to receiving the boot image of the operating system, the operating system runs on the remote server.

Step 630 (stage 3) of process 600, includes sub-steps 632-650. It is to be understood that steps 632-648 are somewhat similar to steps 612-628, but are different in that the steps 632-650 occur while the remote server is in production or deployed at the insecure site.

Step 630 is implemented by the DHCP daemon 601, remote boot client 603, HTTP daemon 605, and image storage 607 for the production boot of the remote server while the remote server is in the remote site that is possibly insecure. Step 630 can support the steps 552 and 554 illustrated in FIG. 5.

In step 632, the remote boot client 603 boots from a bootloader supported by iPXE, such as trusted GRUB. In step 634, the client requests an address and the boot script from the DHCP daemon 601. In step 636, the DHCP daemon returns and address and a URL for the boot script. In step 638, the client makes a HTTP request to the HTTP daemon for the boot script.

The remote boot client executes the boot script in step 644, the remote boot client 603 makes a HTTPS request (GET https://url/files) to the HTTP daemon 605 to get images for booting at least the operating system of the remote server. In step 646, the HTTP daemon retrieves the boot images for at least the operating system of the remote server through a negotiation with the image storage 607. In response to the negotiation, in step 648, the boot image for at least the operating system is sent to the client from the HTTP daemon 605 to the remote boot client 603. In response to receiving the boot image of the operating system, the operating system runs on the remote server. In step 650, the HTTP daemon 605, through a negotiation, manages storage of the keying information at the image storage 607. The keying information stored from step 650 includes keying information associated with the deployed and booted remote server.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module can be stored on a computer readable medium for execution by a processor. Modules can be integral to one or more servers, or be loaded and executed by one or more servers. One or more modules can be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure can be implemented in many manners and as such are not to be limited by the foregoing exemplary embodiments and examples. In other words, functional elements being performed by single or multiple components, in various combinations of hardware and software or firmware, and individual functions, can be distributed among software applications at either the client level or server level or both. In this regard, any number of the features of the different embodiments described herein can be combined into single or multiple embodiments, and alternate embodiments having fewer than, or more than, all of the features described herein are possible.

Functionality can also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that can be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications can be made to the elements and operations described above to obtain a result that remains within the scope of the systems and processes described in this disclosure.

What is claimed is:

1. A method for booting a remote server, comprising:
   initiating, by a boot script at a remote server, a boot of the remote server that comprises a secure cryptoprocessor comprising a root key that is unique to the secure cryptoprocessor;
   fetching, by the boot script and from an image database through an image server, keying information comprising a client certificate associated with the remote server and a private key of a key pair associated with the remote server, the key pair generated by the secure cryptoprocessor based on the root key of the secure cryptoprocessor and the client certificate created from a public key of the key pair;
   loading, by the boot script, the keying information into the secure cryptoprocessor;

establishing a mutually authenticated secure channel between the remote server and the image server by authenticating the remote server and the image server via mutual authentication based at least in part on the loaded keying information;

fetching, via the mutually authenticated secure channel, images of components of the remote server from the image server; and continuing the boot of the remote server with the fetched images of components of the remote server.

2. The method of claim 1, wherein the secure cryptoprocessor is a trusted platform module (TPM), and wherein the root key is a storage root key (SRK) of the TPM.

3. The method of claim 2, wherein the boot script is implemented by preboot execution environment client firmware and bootloader that supports HTTPS and TPM operations.

4. The method of claim 3, further comprising: when the remote server is powered on, invoking a bootloader of the preboot execution environment that supports TPM operations, and loading, by the bootloader, the preboot execution environment.

5. The method of claim 4, further comprising issuing, by the preboot execution environment, a DHCP request for a network address for the remote server and a network address of the boot script.

6. The method of claim 5, further comprising fetching, by the boot script, the keying information according to the network address of the remote server.

7. The method of claim 6, wherein the continuing the boot of the remote server with the fetched images of components of the remote server occurs in RAM of the remote server.

8. The method of claim 1, further comprising: encrypting, by the TPM, the private key of the key pair based on the root key.

9. The method of claim 8, further comprising sealing, by the TPM, the private key based on the root key and PCRs of the TPM.

10. The method of claim 1, wherein the fetching of the images of components of the remote server from the image server is initiated by HTTPS requests from the boot script to the image server.

11. The method of claim 1, wherein the fetched images comprise images selected from the group consisting of a kernel image, an operating system image, and intermediate images for booting into the operating system image.

12. A remote server, comprising:
a trusted platform module (TPM) that is embedded in the remote server before the remote server is distributed to a remote site, the TPM configured to:
generate a key pair based on a storage root key (SRK) of the TPM;
create a client certificate from a public key of the key pair; and
output the key pair and the client certificate for registration at an image database communicatively coupled to an image server, the image server comprising images of components of the remote server;
and instructions stored in memory of the remote server that are executable by a processor of the remote server to retrieve an image of a boot script, the boot script configured to fetch, from the image server, images of components of the remote server via a mutually authenticated secure channel between the remote server and the image server established at least in part on a private key of the key pair and the certificate fetched from the image server, the boot script further configured to cause the remote server to boot with the images of components of the remote server fetched from the image server.

13. The remote server of claim 12, wherein the boot script is implemented by preboot execution environment client firmware and bootloader that supports HTTPS and TPM operations.

14. The remote server of claim 13, wherein the preboot execution environment is configured to issue a DHCP request for a network address of the remote server and a network address of the boot script.

15. The remote server of claim 14, wherein the preboot execution environment is configured to fetch the private key and the client certificate upon receiving the addresses of the remote server and the boot script.

16. The remote server of claim 15, wherein when the image of the boot script is loaded in RAM of the remote server, the boot script is configured to load the fetched images from the image sever to RAM of the remote server.

17. A remote server, comprising:
a secure cryptoprocessor, comprising a root key that is unique to the secure cryptoprocessor, and configured to generate a key pair based on the root key; and
a boot script, configured to:
initiate a boot of the remote server;
fetch, from an image database through an image server, keying information comprising a client certificate associated with the remote server and a private key of the key pair associated with the remote server, the client certificate created from a public key of the key pair;
load the keying information into the secure cryptoprocessor;
establish a mutually authenticated secure channel with the image server by authenticating the image server via mutual authentication based at least in part on the loaded keying information;
fetch, via the mutually authenticated secure channel, images of components of the remote server from the image server; and
continue the boot of the remote server with the fetched images of components of the remote server.

18. The system of claim 17, wherein the secure cryptoprocessor is a trusted platform module (TPM).

19. The system of claim 18, wherein the root key is a storage root key (SRK) of the TPM.

20. The system of claim 17, wherein the mutual authentication comprises transport layer security (TLS) mutual authentication.

* * * * *